May 16, 1950  N. L. OATES  2,507,809
FISH LOCATING MEANS FOR FEEDER TABLES
Original Filed April 15, 1940  2 Sheets-Sheet 1

Inventor
Norford L. Oates
By Reynolds & Beach
Attorneys

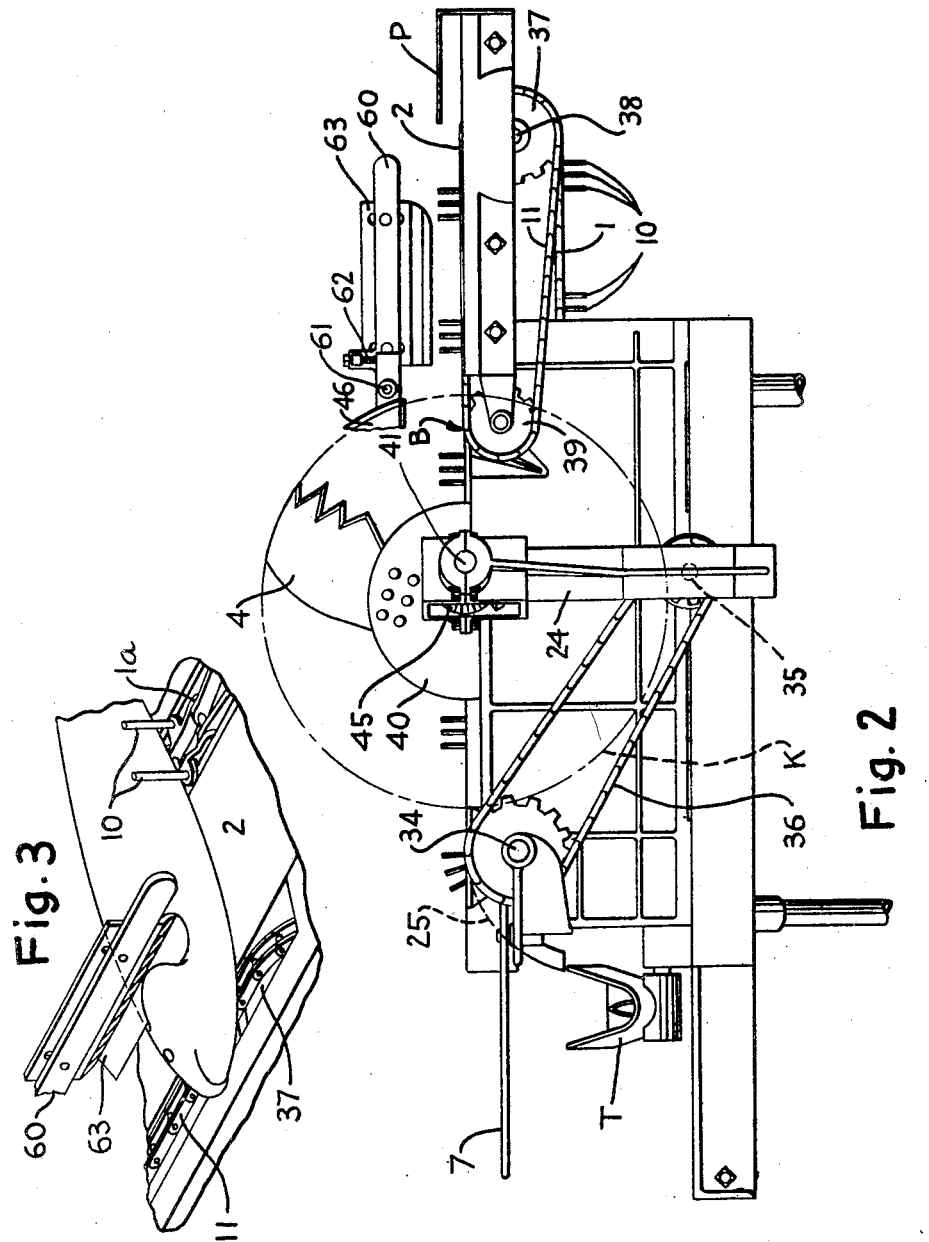

Patented May 16, 1950

2,507,809

UNITED STATES PATENT OFFICE 2,507,809

FISH LOCATING MEANS FOR FEEDER TABLES

Norford L. Oates, Seattle, Wash., assignor to Smith Cannery Machines Company, Seattle, Wash., a corporation of Washington Original application April 15, 1940, Serial No. 329,714. Divided and this application May 12, 1942, Serial No. 442,706

10 Claims. (Cl. 17—4)

The present application deals with the positioning of individual fish as they are started or advanced along a feeder table towards a distant beheading point, preparatory to further advance into and through a fish-dressing machine. The present application is divided from my copending application Serial No. 329,714, filed April 15, 1940, now Patent 2,346,935, dated April 18, 1944.

Each individual fish is disposed upon such feeder tables transversely of the direction of its advance, usually with its belly rearmost. Each such fish is engaged by a series of upstanding traveling pins, spaced along the table from other such series, and is advanced bodily lengthwise of the table to a beheading point at the opposite end of the table. At this beheading point is disposed a beheading knife, which knife may be either immovable, with means provided for advancing the fish to and past the knife for beheading, or movable, for instance being rotatable and properly timed with the fish-advancing means, to sever the head when the fish arrives in exactly the proper position with respect to this beheading point.

The beheading point, therefore, is precisely located transversely of the table, and in order that too much of the usable flesh to the rear of the fish's head shall not be severed with the head, and thus wasted, or, on the other hand, that the head shall not be severed too shortly, thereby leaving too much of the bony structure of the gill case and pectoral girdle attached to the body of the fish, it is necessary that the fish also be precisely located in the direction of its own length, or transversely of the table, and with respect to the beheading point, which is in effect a registry point.

There is no particular difficulty in so doing if the attendant who locates the fish upon the table is reasonably attentive, skillful, and agile, and uses reasonable judgment, yet on the other hand, such machines operate at considerable speed, perhaps 80 to 90 fish a minute, the work becomes monotonous, and the attendants are usually inattentive and careless. The result is, no dependence can be placed upon the judgment, care or skill of the operator correctly to position the fish in this respect. Inspection of the heads will usually show a large wastage of the especially valuable part of the fish which lies immediately behind the head.

While the necessity of accurate registry of the fish with the beheading point was understood, and various means had been proposed to secure that result, there had been none hitherto which did not in too great measure rely upon the care, judgment or skill of the attendant. It had been proposed, for instance, to locate an upstanding pin to enter and pierce the lowermost gill of the fish, and thus to serve as a locating means, but this, while practicable with lower feed rates formerly prevalent, is impracticable to use at the higher feed rates mentioned above, and which now prevail. Snout boards, too, had been proposed, located parallel to the direction of advance of the fish's snout, and against which the snout of the fish could be pressed to locate the fish transversely of the table. This would unquestionably locate the extreme snout of all the fish in a single line, but in commercial salmon canneries the fish may run in the same day, or in the same catch, from 4 pounds, or even 3 pounds, up to 20 pounds or more. Such fish, varying so greatly in weight, will naturally vary in the length of their heads, with the result that a snout board which is correctly positioned for one size of fish is incorrectly positioned for a different size. If the feeder table is to handle random sizes of fish the snout board must be set at some compromise setting, with the result that most fish are improperly located.

It has also been proposed to hook a fin, such as the pectoral fin, over a guide rail, disposed parallel to the direction of advance of the fish, thereby to serve as a stop means to locate the fish in the direction of its length and transversely of its direction of advance. While this is a material improvement in that it places a minimum of reliance on the care, skill and judgment of the attendant, it still does not procure accurate registry, in random sizes of fish, between the beheading point or knife and the pectoral girdle of the fish. The pectoral fin frequently sticks tightly to the side of the fish so that it cannot be engaged readily. It is small and soft, engagement of a plate edge with its base cutting deeply into it to render the registry inaccurate and perhaps cutting it off completely. Sometimes this fin has been torn off in handling before the fish is placed on the feed table. Remembering that it is the primary aim, on the one hand, to prevent cutting off with the head too much of the flesh behind the pectoral girdle, and on the other hand to prevent the cutting off with the body of too much of the bony structure, made up of the gill case and the pectoral girdle, it is evident that the pectoral girdle and the gill case alone are the critical points, and that there must be a precise registration with those points rather than with any other part of the fish's anatomy. The pectoral fins will be differently spaced from the pectoral girdle in different sizes of fish, therefore a location by the pectoral fin will be inaccurate, added to which the fin or the surrounding flesh may become flabby or misplaced, and the accuracy of location is further adversely affected thereby.

It will be evident that the above considerations, namely, the accurate location of the fish in the direction of its own length with respect to a beheading point toward which it is advanced bodily while lying transversely of its direction of advance, are quite independent of the nature of the beheading action, or whether the knife is fixed or rotary, or how the knife is positioned with respect to the advancing fish. Accordingly the subject-matter of this application is deemed to be properly divisible from my copending application referred to above, and to be proper subject-matter for a separate patent.

From the above discussion it will be evident that the primary object of the present invention is to provide an improved means, not dependent upon the skill, care, or judgment of the operator, but upon habit alone, to locate fish upon such a feeder table accurately with respect to the distant beheading point toward which they are advanced, to the ultimate end of conserving the usable flesh and of avoiding the inclusion in the pack of an undue amount of bony material.

In the accompanying drawings I have shown my invention embodied in a form which illustrates the principles of my invention in relation to a feeder table of the general type disclosed and claimed in my copending application referred to above.

Figure 2 is a side elevation of the feeder table.

Figure 3 is a perspective view of the fish positioning means and associated elements.

Figure 1:
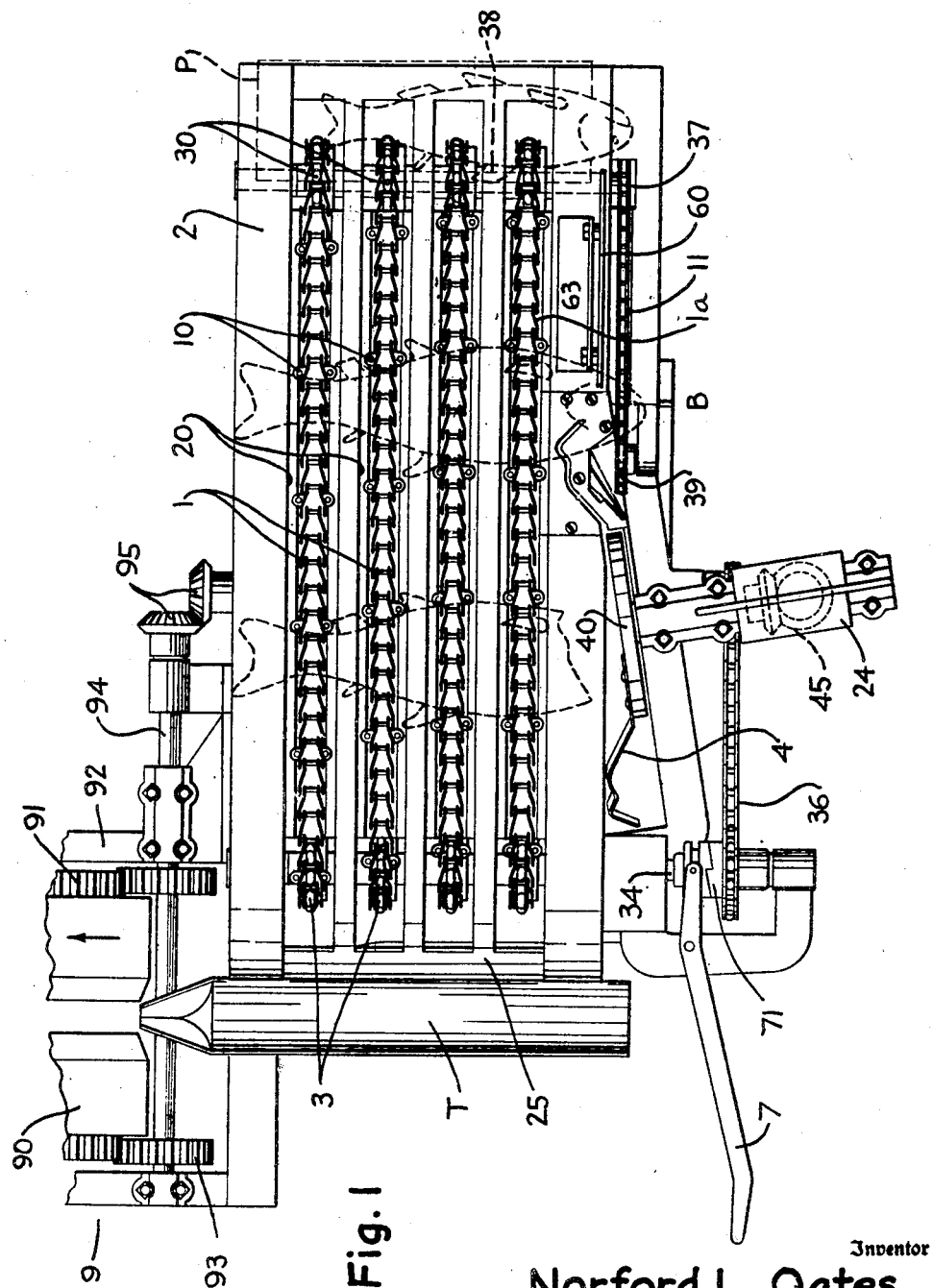
Figure 1 is a plan view of the feeder table, illustrating also portions of the fish-dressing machine, certain guards and the like being omitted for clearer illustration.

The fish-dressing machine is generally indicated at 9, and includes a bull ring 90 rotated in the direction of the arrow (Figure 1) by gears 91 in a frame 92 driven by meshing pinions 93 on a shaft 94. Power for driving the feed means may be taken off through a pair of bevel gears 95. The fish are supplied to the feed table from a feed platform P, and are slid down a curved surface 25 at the opposite end of the feed table to a trough T which is inclined to deliver beheaded fish, tail end first, to the bull ring 90 for proper cooperation with the fish-dressing elements of the machine 9, which elements are not shown.

The feeder table includes a flat bed 2 having longitudinal grooves 20 within which are received the upper run of endless feed chains 1, which at spaced intervals are provided with upstanding pins or lugs 10. The chains 1 pass over sprocket wheels 3 and 30 at opposite ends of the table. The sprocket wheels 3 are carried upon a shaft 34 which is driven from the shaft 35, which at one end receives one of the bevel gears 95 shown in Figure 1, the connection between the shafts 34 and 35 being by the sprocket chain 36 and suitable drive sprocket wheels on the respective shafts. Such chain drive may be interrupted by disengaging jaw clutch 71 by swinging handle 7 without stopping rotation of the knife 4. The chain lugs 10 are arranged in a series transversely of the table, to engage a fish at intervals in its length when it is laid transversely upon the table, and they advance the fish to the beheading knife 4 at the beheading point B.

In addition to the chains 1 there may be also provided a head chain 11 extending between a sprocket wheel 37 upon the shaft 38 and a sprocket wheel 39 which is supported from the bed 2 in the vicinity of the beheading point B. This chain 11 is to support and advance the fish's head, which in certain kinds of salmon is quite a large proportion of the total length so that it is given adequate support even though it overhangs considerably the location of the head cut.

In this particular form of the device the beheading knife 4 is secured upon a hub 40 which is carried upon a shaft 41 journaled in a bracket 24 supported from the bed or frame 2. The shaft 41 lies closely adjacent the top surface of the bed 2, so that the cutting edge of the knife 4 is moving substantially normal to the supporting surface of the bed when it engages the fish which is advancing along the bed.

The knife is rotated by any suitable drive means, as, for example, by bevel gears, as represented at 45, which are in turn driven through a vertical shaft which is located behind the bracket 24 in Figure 2, from the shaft 35. By these or similar means the shaft 41 rotates the knife 4 so that it intersects the path of advance of the fish at the beheading point B, while the knife is moving substantially normally to the surface of the bed.

At the beheading point B, where the knife in its downstroke intersects the surface of the bed 2 and passes beneath the surface of the bed, the bed is suitably contoured or slit conformably to the shape of the knife to permit the knife to pass through, but to support the fish adequately and firmly at each side of the knife and close to the path thereof, so that a substantially true shearing action is accomplished, and the fish adequately resists the force of the knife stroke and is cleanly severed at the proper point.

The knife is rotative within a guard, of which only a small fragment is indicated at 46. This guard serves as a convenient support for the fish-locating means, which includes an arm 60 pivoted at 61 upon the guard, and held upraised above but somewhat within the path of advance of the fish by an adjusting screw 62. Positive fish-locating gauge means are carried by arm 60, shown in the form of a rail or bar 63 supported for vertical adjustment relative to the arm by two bolts extending through slots spaced lengthwise along the arm, as shown in Figure 2. This bar is aligned lengthwise of the table 2 with the beheading point B.

In the form shown fish locating bar 63 resembles a letter V turned sideways, and is located so that its lower edge constitutes a blade or plate which will engage behind a bony excrescence of the fish which bears a fairly definite and close relation to the gill case or pectoral girdle, to establish the position of the cut to sever the head from the body. As illustrated, the edge portion of the bar is so located as to engage beneath and abut the tailward side of the fish's uppermost gill cover by relative movement of the fish and bar lengthwise of the fish, as shown clearly in Figure 3 of the drawings, and such relationship is maintained as the fish advances along the locating bar. The operator merely places the fish on the table, the pins 10 pick up the fish and start to advance it, and when the fish is in position where its gill cover can engage the member 63 the operator, who has not yet removed his hand from the fish's head or snout, pushes the fish lengthwise toward its tail end until the member 63, acting as a stop, comes up against the tailward side of the bony excrescence, such as the uppermost gill cover. Such engagement prevents further tailward movement of the fish, and the operator now knows that the fish is properly located. He is required to use no judgment, to exercise no skill, and but a minimum of care is required.

The arm 60 will swing upward to a greater or less extent about pivot 61 as bar 63 rides over each fish, the distance through which the bar moves upward depending upon the thickness of the individual fish. The length of such bar, as shown in Figure 1, will be short enough so that it will drop down to its lowermost position again after each fish is engaged and before the next one is advanced to the bar. The fish is slid along rail 63 by its advance along the table, and thus is located in registry with the beheading point. The stop bar 63 is adjustable transversely of the table to whatever extent is necessary to align it accurately with the beheading point by altering the thickness of the spacers shown in Fig. 1 which are carried by the bolts supporting the stop from arm 60.

What I claim as my invention is:

1. A feed table for a fish-dressing machine, comprising a bed, whereon the fish are laid transversely and flat, means to advance the fish along the bed to and past a beheading point, a stop bar disposed along and generally parallel to the fish's path, in advance of the beheading point, and located to engage beneath the then upper gill cover of each individual fish, to serve as a locating stop, means supporting said bar for movement upwardly and downwardly, to accommodate widely different sizes of fish, but restraining movement of the bar transversely of the table during said adjustment, and a knife movable in a fixed path, bearing a definite relationship to each fish as thus located, to sever the fish's head, at the beheading point.

2. A fish-beheading machine, comprising a feed table for supporting fish transversely thereof, beheading means operable at a beheading station definitely positioned transversely of the feed table to behead fish moved past such station, means to advance fish lengthwise of said table toward the beheading station, means for establishing the position of the beheading cut including a fish locating member above the feed table and having a portion elongated transversely of the length of the fish projecting downwardly toward the fish carried by the feed table, said elongated portion being disposed to abut a side of a bony excrescence of each fish close to the location of the beheading cut by relative movement of the fish and locating member generally lengthwise of the fish, and means supporting said locating member relative to the beheading station to dispose the fish in proper lengthwise relationship thereto to position the cut by such abutment of said locating member.

3. A fish-beheading machine, comprising a feed table for supporting fish transversely thereof, beheading means operable at a beheading station definitely positioned transversely of the feed table to behead fish moved past such station, means to advance fish toward the beheading station, a bar, and means above said feed table supporting said bar substantially in line with the beheading station, said bar being formed for engagement beneath and for abutment with the tailward side of the upper gill cover of a fish lying on its side on said table, by lengthwise movement of the fish transversely of the table.

4. A fish-beheading machine, comprising a feed table for supporting fish transversely thereof, beheading means operable at a beheading station definitely positioned transversely of the feed table to behead fish moved past such station, means to advance fish toward the beheading station, and a fish locating bar extending generally transversely of the length of the fish, supported above said feed table, and having an edge portion inclined downward toward the head end of the fish carried by the feed table to abut the tailward side of a bony excrescence of each fish close to the location of the beheading cut by relative movement of the fish and bar generally lengthwise of the fish, to position such fish lengthwise in proper relationship to the beheading station.

5. A fish-beheading machine, comprising a feed table for supporting fish transversely thereof, beheading means operable at a beheading station definitely positioned transversely of the feed table to behead fish moved past such station, means to advance fish toward the beheading station, and a fish locating bar extending generally transversely of the length of the fish carried by the feed table, supported above said feed table, and having an edge portion inclined downward generally toward the head end of the fish carried by the feed table for engagement beneath and abutting the tailward side of the upper gill cover of a fish to serve as a locating stop, said locating bar being positioned relative to the beheading station to dispose the fish thus engaged in proper lengthwise relationship thereto.

6. A fish-beheading machine, comprising a feed table for supporting fish transversely thereof, beheading means operable at a beheading station definitely positioned transversely of the feed table to behead fish moved past such station, means to advance fish toward the beheading station, a fish locating bar extending generally transversely of the length of the fish carried by the feed table, supported above said feed table, and having an edge portion inclined downward generally toward the head end of the fish carried by the feed table for engagement beneath and abutting the tailward side of the upper gill cover of a fish to serve as a locating stop, and means supporting said bar for movement upwardly and downwardly, to accommodate widely different sizes of fish, but restraining movement of the bar transversely of the table during such adjustment, and positioning said bar relative to the beheading station to dispose the fish thus engaged in proper lengthwise relationship thereto.

7. A feed table for fish-dressing machines, comprising means to advance along the table toward a beheading station fish laid crosswise of the table, and means for locating the fish lengthwise relative to the beheading station, including a fish locating member above the feed table and having a portion elongated transversely of the length of the fish projecting downwardly toward the fish carried by the feed table, said elongated portion being disposed to abut the tailward side of a bony excrescence of each fish close to the location of the beheading cut by relative movement of the fish and locating member generally lengthwise of the fish, and means supporting said locating member for upward movement by riding upon a fish to vary its spacing from the feed table as required for engagement with fish of different size.

8. A feed table for fish-dressing machines, comprising means to advance along the table toward a beheading station fish laid crosswise of the table, and means for locating the fish lengthwise relative to the beheading station, including a blade extending generally in the direction of advance of the fish, located above the feed table and projecting edgewise downwardly toward the fish carried by the feed table, said blade being disposed to abut a side of a bony excrescence of each fish close to the location of the beheading cut by relative movement of the fish and blade generally lengthwise of the fish, and means supporting said blade for upward movement by riding upon a fish to vary its spacing from the feed table as required for engagement with fish of different size, said blade being of a length less than the distance between successively advancing fish.

9. A fish-beheading machine, comprising a feed table for supporting fish transversely thereof, beheading means operable at a beheading station definitely positioned transversely of the feed table to behead fish moved past such station, means to advance fish toward and past the beheading station, means for establishing the position of the beheading cut including a blade positioned in advance of the beheading station and having an edge portion lying substantially in a plane disposed transversely of the length of the fish and intersecting the feed table at a substantial angle, said blade edge portion thus projecting toward the fish to abut a bony excrescence of each fish close to the location of the beheading cut, and means supporting said blade relative to the beheading station to dispose the fish in proper lengthwise relationship thereto.

10. A fish-beheading machine, comprising a feed table for supporting fish transversely thereof, beheading means operable at a beheading station definitely positioned transversely of the feed table to behead fish moved past such station, means to advance fish toward the beheading station, and a locating member above said feed table for establishing the position of the beheading cut, having a surface extending generally transversely of the length of the fish disposed to abut a bony excrescence of each fish close to the location of the beheading cut by relative movement of the fish and locating member generally lengthwise of the fish, said locating member being positioned relative to the beheading station to dispose the fish, by engagement of such bony excrescence with said locating member, in proper lengthwise relationship to the beheading station.

NORFORD L. OATES.

REFERENCES CITED

The following references are of record in the file of this patent:

UNITED STATES PATENTS

| Number | Name | Date |
|---|---|---|
| 1,222,926 | Brierly et al. | Apr. 17, 1917 |
| 1,643,504 | Lea | Sept. 27, 1927 |
| 1,909,643 | Waugh | May 16, 1933 |
| 2,245,330 | Danielsson | June 10, 1941 |

FOREIGN PATENTS

| Number | Country | Date |
|---|---|---|
| 515,764 | Great Britain | Dec. 13, 1939 |